Dec. 5, 1967   B. V. RHODES   3,355,891
RAM JET ENGINE AND FUEL INJECTION SYSTEM THEREFOR
Filed May 2, 1966
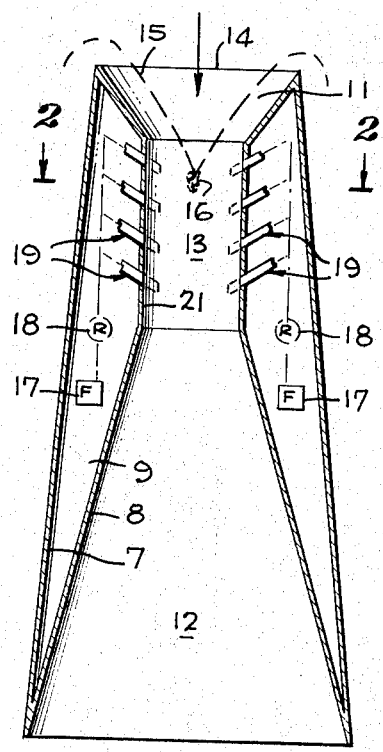
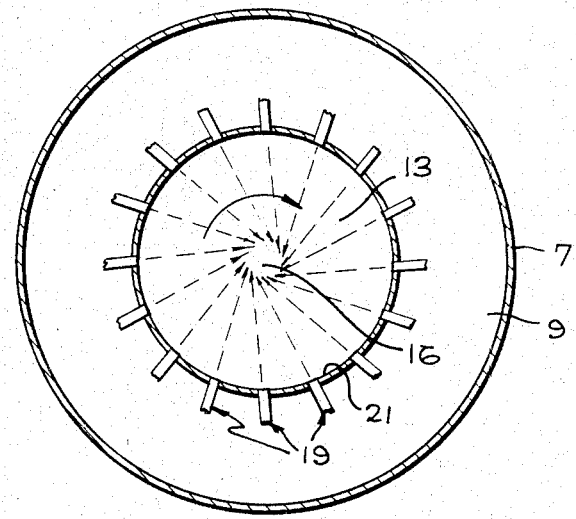
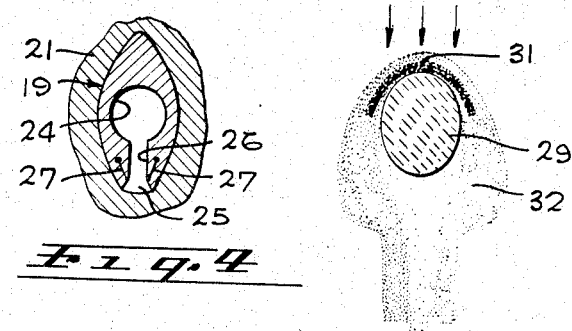
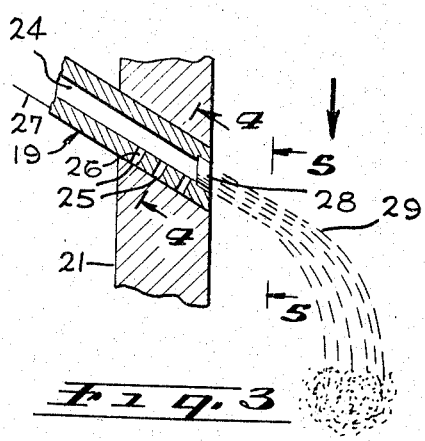
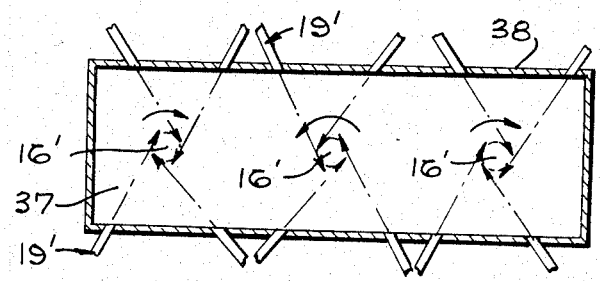
INVENTOR.
BARRY V. RHODES
BY
ATTORNEY

United States Patent Office 3,355,891
Patented Dec. 5, 1967

3,355,891
RAM JET ENGINE AND FUEL INJECTION SYSTEM THEREFOR
Barry V. Rhodes, 22358 Baltar,
Canoga Park, Calif. 91304
Filed May 2, 1966, Ser. No. 548,029
1 Claim. (Cl. 60—270)

ABSTRACT OF THE DISCLOSURE

A ram jet or similar aerothermodynamic duct having a fuel injection system adapted to impart a swirling motion to the injected fuel and an ignition system for igniting said fuel during subsonic operation and designed to ingest and utilize a converging shock wave to create a hot spot of compressed air capable of sustaining combustion of said fuel during supersonic operation.

---

This invention relates to improvements in aerothermodynamic ducts, and particularly in aerothermodynamic ducts having the capability of ingesting the shock wave created when they are accelerated through air to supersonic and hypersonic velocities.

Because of their high theoretical thrust-to-weight characteristics, ease of maintenance, and other highly desirable features, aerothermodynamic ducts, commonly known as "ram jets," have long appealed to the aeronautical industry as a potential source of power for high speed airborne vehicles. Unfortunately until recently the practical problems associated with the design and construction of engines of this category have severely limited their wide spread acceptance and application.

The typical prior art ram jet is essentially an open-ended duct in which air, entering its forward end, is compressed, heated by the combustion of injected fuel, and allowed to expand, thus creating forwardly directed thrust, as it is exhausted back into the atmosphere through the rear of the duct. Historically such devices have been beset with difficulties involving their fuel injection and ignition systems. Customarily these systems have employed accessory equipment positioned in the flow stream within the duct itself. Thus far the problems of design, strength, and materials created by the need to support such auxiliary equipment in the intensely hot supersonic flow stream have proved nearly insurmountable. Equal difficulties have been encountered in controlling the location and path of combustion within the flow stream of such devices in order to achieve and maintain adequate thrust for sustained flight.

Additionally, the presence of relatively massive structures within the duct affects both the flow of air and combustion products in the central portion of the duct and the boundary layer ordinarily lying close to the walls of the duct, thereby substantially reducing the efficiency and thrust of the engine.

The many and varied efforts heretofore made in any attempts to resolve the foregoing problems and many others associated with prior art ram jet engines have led to the restriction of the effective operating velocities of these engines, which renders them impractical and generally unacceptable for most uses.

These deficiencies have been partially resolved by the recent development of an aerothermodynamic duct capable of ingesting the compression wave created by the axial movement of the duct through the air at supersonic and hypersonic velocities and adapted to utilize the hot spot created by the converging compression wave to then auto-ignite fuel injected into the hot spot; but a multitude of problems still remain, and a number of others have been created by such ducts.

Heretofore hydrocarbons have been the principal fuels used in ram jet engines; however, it has been proved that for supersonic and hypersonic operations hydrogen is a much more effective fuel. The reaction rate time for hydrogen is on the order of milliseconds, and that for hydrocarbon fuels, while considerably longer, is still of the order of tenths of seconds. At operational combustion flow speeds of the order of 10,000 feet per second, even the very rapidly combustible hydrogen fuel is swept out of the aerothermodynamic ducts of this more modern design before it can be fully oxidized and maximum use made of its thrust-producing energy. This problem is magnified considerably where the slower burning hydrocarbon fuels are employed.

In addition to the flow instability and boundary layer control problems attendant with the older prior art ram jet engines, the new generation of compression wave ingesting auto-igniting aerothermodynamic ducts establishes requirements for flame holding and supersonic combustion maintenance capabilities heretofore not encountered. The subject invention not only meets these requirements, but also furnishes an effective solution to many of the other problems previously mentioned.

It is an object of the subject invention to provide a simple effective system for injecting and igniting fuel in the flow stream of an aerothermodynamic duct.

Another object is to provide fuel injection means capable of controlling the location and path of fuel combustion within the flow passageway of an aerothermodynamic duct.

Another object is to provide a method and means to achieve and maintain efficient thrust-producing combustion within an aerothermodynamic duct regardless of the axial velocity of the duct through the air.

Another object is the provision of fuel injection and ignition means for use in aerothermodynamic ducts which avoid substantial disruption of the flow and boundary layer characteristics of such ducts.

Still another object is the provision of fuel injection ignition means for aerothermodynamic ducts giving them self-sustaining capability through a broad range of subsonic, transonic, and supersonic and hypersonic velocities.

The subject invention has for another object the provision of means for increasing the stay-time of fuel in aerothermodynamic ducts to take the greatest possible advantage of the thrust-producing energy of such fuel.

Another object is to provide means for insuring the adequate mixing of fuel and air for combustion in aerothermodynamic ducts.

Another object is to provide a fuel injection system for such ducts which enhances the flow stability therein. Yet another object is to provide a fuel injection system which includes a flame holder to assist in maintaining supersonic combustion within such ducts.

In addition, it is an object of the subject invention to provide improved methods for use in connection with aerothermodynamic ducts which will permit them to achieve the objects heretofore stated.

Numerous other and further objects are contemplated by the subject invention and these will be perceived, and a full understanding had, by referring to the following description and claims taken in conjunction with the accompanying drawings in which:

FIGURE 1 is a very much simplified schematic view taken in section through the side of a typical aerothermodynamic duct embodying the subject invention;

FIGURE 2 is an enlarged cross-sectional view taken through the duct of FIGURE 1 at 2—2;

FIGURE 3 is a somewhat enlarged cross-sectional view taken through one preferred embodiment of the fuel injector of the subject invention;

FIGURE 4 is a greatly enlarged cross-sectional view taken through the fuel injector of FIGURE 3 at 4—4;

FIGURE 5 is a greatly enlarged cross-sectional view taken at 5—5 showing the shock wave created by the stream of fuel injected by the fuel injector of FIGURE 3 into the flow stream of air passing at supersonic velocity through an aerothermodynamic duct; and FIGURE 6 is a highly schematized cross-sectional view illustrating another preferred embodiment of the subject invention in an aerothermodynamic duct having a non-circular flow passage.

With reference to the drawings, the typical athodyd, ram jet or aerothermodynamic duct to which the subject invention relates is essentially simply a nozzle set into a streamlined body containing fuel tanks and a system for injecting the fuel into the combustion region. As illustrated in FIGURES 1 and 2, this device may be constructed of an outer wall 7 formed in a forwardly tapering frusto-conical shape and an inner wall 8 joined to it at its leading and trailing edges to form an enclosed annular accessory space 9. The duct formed by the inner wall is an open ended elongated tubular passage.

In the most modern generation of such devices this passage is divided into three regions: a relatively short anterior portion or inlet diffuser 11, having sharply tapered walls; a relatively long posterior portion or outlet diffuser 12, having rather gradually outwardly tapered walls; and an elongated centrally located portion or throat 13 interconnecting the former and the latter.

When a duct having this configuration is accelerated axially through the atmosphere, air entering inlet diffuser 11 through inlet 14 is compressed by the rearwardly tapered sides 8. If fuel is injected into this compressed air and ignited the air is heated and expands as it moves rearwardly into the outlet diffuser 12. This rearwardly moving expanding air exerts a force against the walls 8 of outlet diffuser 12, thereby creating a forwardly directed thrust which may be utilized to propel the duct through the air.

The power generated by the aerothermodynamic duct is proportional to the product of thrust and velocity. Thus it has generally been considered suitable only for high speeds; but its power, insignificant at conventional speeds, rises sharply as supersonic and hypersonic speeds are approached.

At such speeds a compression or shock wave builds up in front of the leading edge of the inlet 14. In the most advanced form of aerothermodynamic duct the inlet diffuser 11 is designed with the cross-sectional area at the inlet substantially larger than that at the narrowest part of the throat 13. In this configuration the inwardly directed trailing edge of the shock wave is swallowed by the tubular passage. Following the inwardly tapered wall 8 of the inlet diffuser 11 the roughly conical shaped wave of compressed air converges at a point near the forward end of the throat 13. It has been found that this converging shock wave generates a hot spot 16 of extremely high temperature; and this discovery has been applied to furnish means for the auto-ignition of fuel injected into the tubular passage at or near the hot spot.

In the subject invention this fuel injection is accomplished by means of a number of fuel injectors 19 positioned around the periphery of wall 21 of throat 13. These injectors may be arranged in a ring, lying substantially in a plane normal to the major axis of the tubular passage or, as shown in FIGURE 1, in a plurality of such rings, formed at spaced intervals along the length of throat 13, or they may be positioned in other locations along the wall 8 of the tubular passage.

The injectors 19 are connected by suitable feed lines (this is shown schematically) to a source of fuel under pressure, such as pressurized fuel tanks 17 in accessory space 9. Fuel pressure regulators 18 are provided to permit the accurate adjustment and control of the pressure of fuel flowing to injectors 19.

For reasons which will be explained subsequently, fuel injectors 19 are preferably directed inwardly and rearwardly into the tubular passage. As shown most clearly in FIGURE 2, the fuel injectors 19 are also displaced angularly from the central longitudinal axis of the tubular passage, so that each of the injected fuel streams is deflected to one side of this axis. The purpose of this arrangement, which lies at the heart of the subject invention, is to impart a spiral motion to the fuel injected into the rapidly moving mass of compressed air flowing through the tubular passage. When the fuel is ignited, this motion is continued and amplified by the flow of the combustion products as they are thrust rearwardly.

Within certain limits the rotational moment imparted by the injected fuel jet streams is a function of the angular displacement of the fuel injectors 19, this displacement must not be so great as to cause the fuel itself or the mechanical effects of its explosive ignition to disrupt or deform the relatively thin boundary layer of air lying adjacent the inner wall 8 of the tubular passage, for the maintenance of this layer is highly important to the efficient operation of ducts of this class. On the other hand, when it is intended to utilize the heat contained in hot spot 16 for the auto-ignition of injected fuel, it is neither necessary nor desirable to deflect the injected fuel stream very far from the center of the hot spot.

FIGURES 3 and 4 show in somewhat greater detail the structure of one preferred form of fuel injector 19. Basically the injector 19 is an elongated tube having an internal duct 24 communicating at the rear end of injector 19 with fuel source 17 and terminating at its forward end in an orifice 28. To minimize the effect of drag on the passing airstream it is highly advantageous to provide injector 19 with a streamlined cross-section. Toward the forward end of the injector 19 a number of ports 24 are provided in its trailing edge and connected by means of passages 26 to the central fuel duct 24. Conventional fuel ignitors 27, such as electrically heated filaments are provided adjacent ports 25 and are connected to a source of energy (not shown).

The injector 19 is made to fit in slidable but close contact with the wall 21 of throat 13. Means (not shown) are provided for extending injector 19 outwardly of the wall 21 so as to expose ports 25, and for withdrawing it until only the tip of orifice 28 is exposed. In this latter position wall 21 forms an effective seal across the openings of ports 25, thereby preventing fuel from being released through them.

Although in its preferred configuration the subject invention is capable of self-starting, its efficiency is so low at very low velocities that self-starting is highly impractical. In operation the aerothermodynamic duct is preferably accelerated by means of an auxiliary power supply to a velocity of at least 250 miles per hour. Fuel injectors 19 are extended into throat 13 and pressure regulator 18 adjusted to inject fuel at the optimum rate through ports 25. Ignitors 27 are activated to ignite the fuel as it leaves ports 25. By virtue of the streamlined design of the injectors 19 and ports 25 the injectors themselves act as flame holders for the continuing combustion of the mixture formed when the injector fuel is mixed with the passing airstream. The angular displacement of the injectors 19 imparts the spiral motion described earlier to the combustion products formed and creates an expanding vortex of hot gases within the tubular passage. As this vortex passes through outlet diffuser 12 it maintains these gases in constant intimate contact with the walls 8 of the diffuser, thereby insuring the maximum application of thrust against the diverging walls 8.

As the duct is accelerated from subsonic to transsonic and then supersonic velocity, a shock wave is formed around the mouth of inlet 14 and swallowed by inlet diffuser 11. As soon as this shock becomes stabilized and hot spot 16 is formed in the mouth of throat 13, injectors 19 are withdrawn into the wall 21 of throat 13, thereby sealing off ports 25. During this transition phase fuel regulator 18 is utilized to adjust the flow of fuel through orifice 28 so as to direct fuel stream 29 into hot spot 16, where the fuel-air mixture is auto-ignited by the heat created by the compression wave.

Experiments carried on in the hypersonic wind tunnel have shown that when a stream of fluid, such as the gaseous hydrogen or liquid hydrocarbon fuels used in the aerothermodynamic duct of the subject invention, are injected under substantial pressure into a mass of air moving at supersonic or hypersonic speeds, the stream acts very much in the same manner as a solid rod held in the path of the passing air mass. A compression wave is built up at the leading edge of the fluid stream along its length. In FIGURE 5 the direction of supersonic air flow is shown by three arrows, and the compression or shock wave is indicated by numeral 31. Under proper conditions, including appropriate fuel injection velocity and fuel stream diameter, both of which may be controlled by fuel regulator 18 and the proper selection of fuel jet orifice 28, this shock wave creates a hot spot 32 identical for all practical intents and purposes with hot spot 16 created by the ingestion of converging shock wave 15. While the temperatures within the hot spots surrounding the fuel stream 29 vary considerably, sufficient heat is generated for the auto-ignition of the fuel-air mixture. Since the injected fuel stream is capable of creating its own auto-igniting hot spot 32 in any mass of air flowing in supersonic or hypersonic velocity, the fuel injection system of the subject invention is not limited to use in thermodynamic ducts, but may be employed wherever shock-induced mixing, auto-ignition or combustion is desired. This system is, however, of particular value in connection with shock wave-ingesting form of athodyd because it permits a smooth transition from sonic to supersonic operation and allows the use of the most efficient number of suitable orientated fuel injectors, thereby increasing the quantity of fuel which can be burned with air in the tubular passage, thereby creating additional thrust, without the need for auxiliary fuel igniting apparatus.

The spiral-producing and vortex-controlling features of the subject invention, which permit the length and relative position of the flow path followed by the air and injected fuel mixture, and therefore its stay-time within the tubular passage, to be adjusted within very broad limits, insure that regardless of the axial velocity of the engine, the fuel will be fully burned before it is exhausted from the outlet diffuser 12, and therefore that its thrust-producing energy will be efficiently utilized.

FIGURE 6 illustrates the preferred embodiment of the subject invention, an aerothermodynamic duct having a tubular passage 37 of rectangular cross-section into which fuel is injected to form several combustion centers 16' across the passage. By imparting counter-rotating spiral motion to the fuel and combustion products around the several combustion centers 16', the fuel injectors 19' in the walls 38 of the rectangular tubular passage 37 can be utilized not only to provide for efficient combustion of large quantities of fuel, but also to stabilize the flow of gases through passage 37.

Although the subject invention has been described in its preferred forms with a certain degree of particularity, it is understood that the present disclosure of these forms has been made only by way of example and that numerous changes in the details of construction and the combination and arrangements of components may be resorted to without departing from the spirit and the scope of the invention as hereinafter claimed.

What is claimed is:

An aerothermodynamic duct comprising:
  an open-ended elongated tubular passage therethrough having:
    a relatively short wide-angle inlet diffuser,
    a relatively long narrow-angle outlet diffuser, and
    an elongated tubular throat interconnecting said inlet diffuser and said outlet diffuser and having a throat-to-inlet area ratio substantially lower than unity whereby on acceleration of said aerothermodynamic duct axially through air to a supersonic velocity there is created a converging shock wave located at least partially within said tubular passage and having its trailing end positioned to create a hot spot of compressed air within said throat;
  a source of fuel under pressure;
  fuel injection means communicating with said fuel source for injecting said fuel into said tubular passage,
  said means directing said fuel into said hot spot when said thermodynamic duct is operated at a supersonic velocity, and imparting to said fuel a spiral motion along the major length of said tubular passage, and comprising:
    a plurality of inwardly and rearwardly directed extensible injector heads spaced around the periphery of said tubular passage,
      means for extending said heads into said tubular passage when said ram jet is operating at subsonic and transonic velocities, and
      means for withdrawing said heads from said tubular passage when said ram jet is operating at a supersonic velocity; and
  fuel ignition means associated with said fuel injection means for igniting said fuel in said passage while said thermodynamic duct is operating at subsonic and transonic velocities.

References Cited

UNITED STATES PATENTS

| | | | |
|---|---|---|---|
| 2,687,010 | 8/1954 | Ellis | 60—39.65 |
| 2,914,912 | 12/1959 | Woll | 60—39.74 |
| 3,040,516 | 6/1962 | Brees | 60—270 |
| 3,199,295 | 8/1965 | Connaughton | 60—39.74 |

OTHER REFERENCES

"A Preliminary Study of the Application of Steady-State Detonative Combustion to a Reaction Engine," by R. Dunlap, R. L. Brehm and J. A. Nicholls, Jet Propulsion, pp. 451–456, July 1958.

MARK M. NEWMAN, *Primary Examiner.*

SAMUEL FEINBERG, *Examiner.*

D. HART, *Assistant Examiner.*